UNITED STATES PATENT OFFICE.

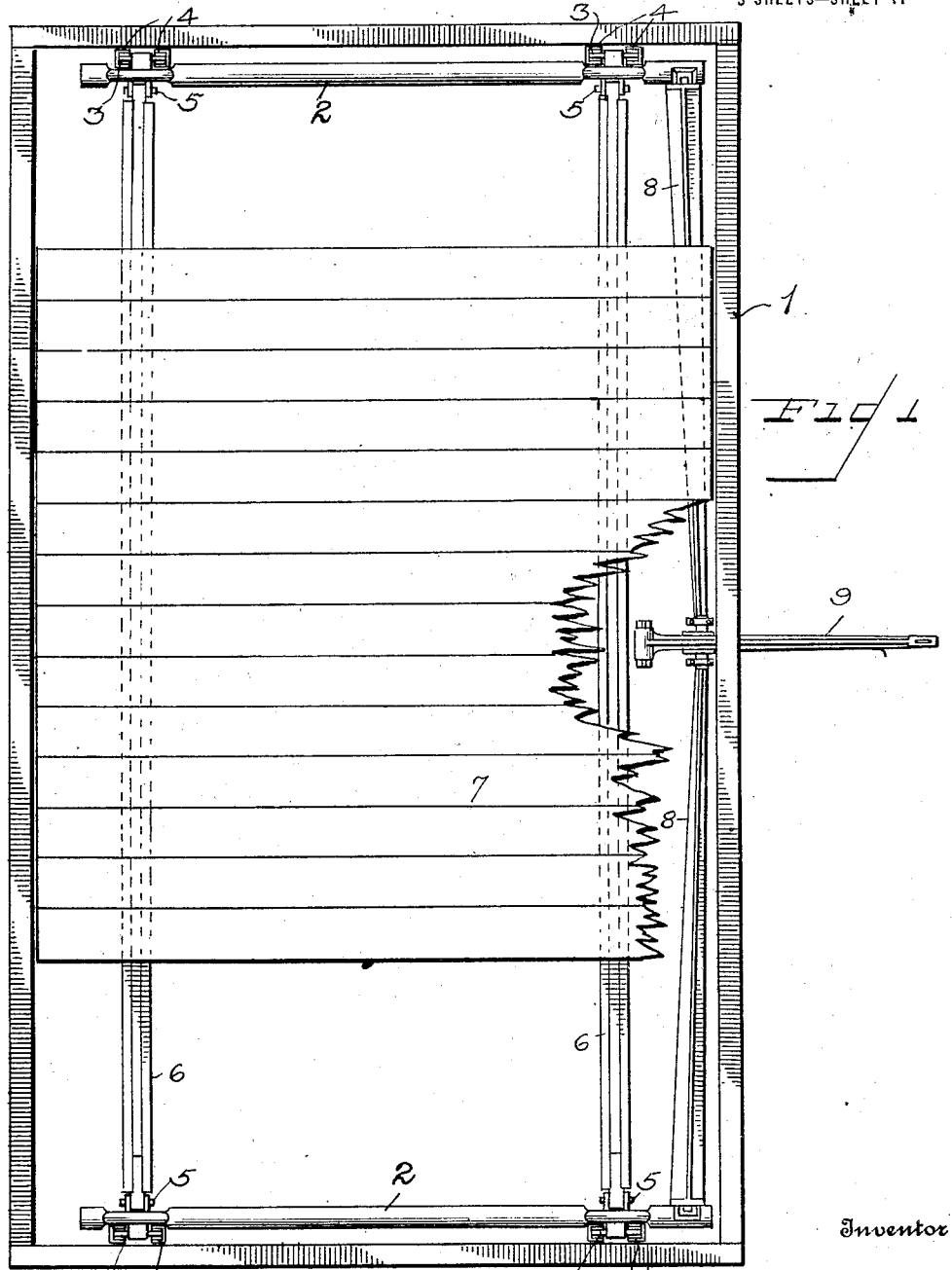

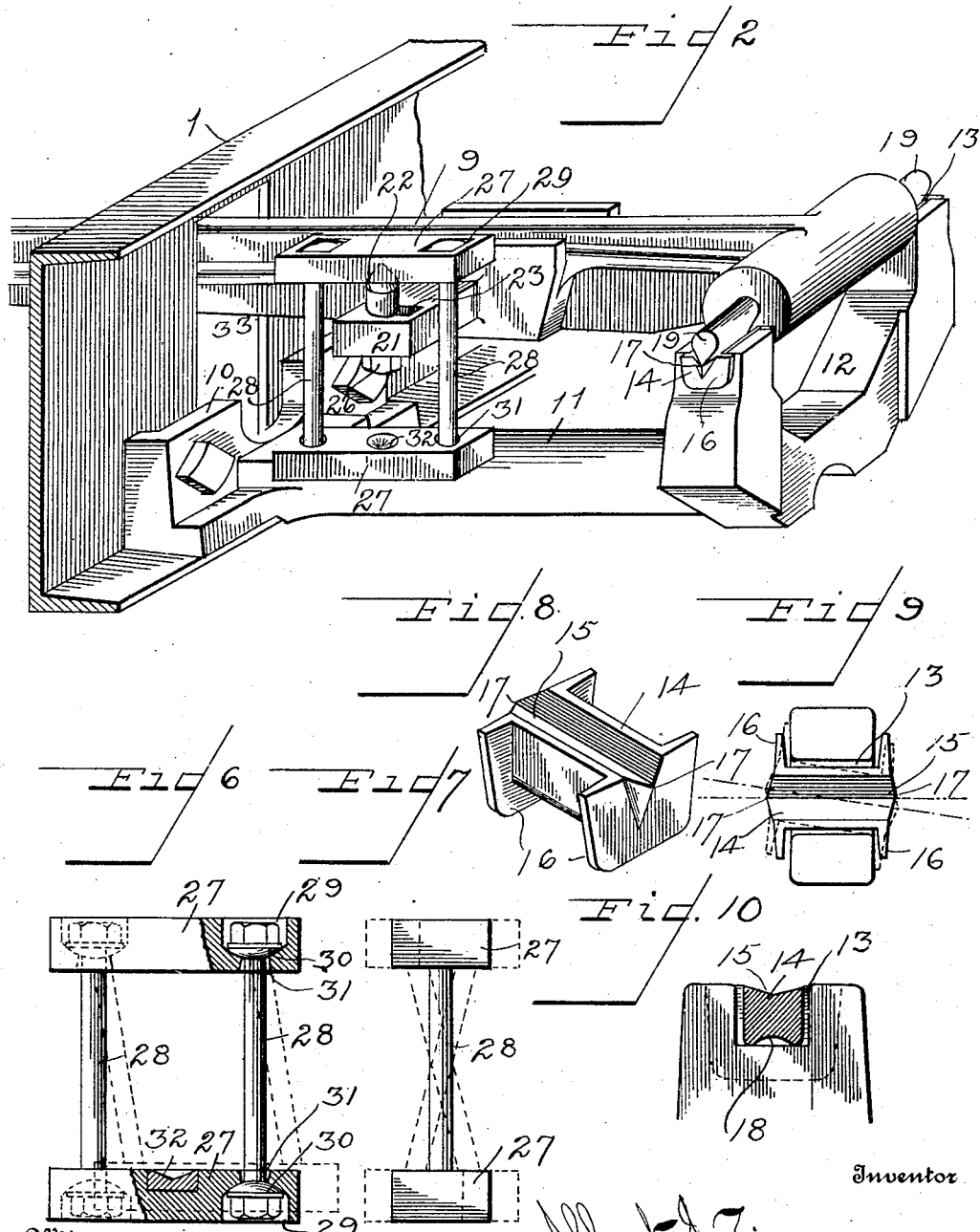

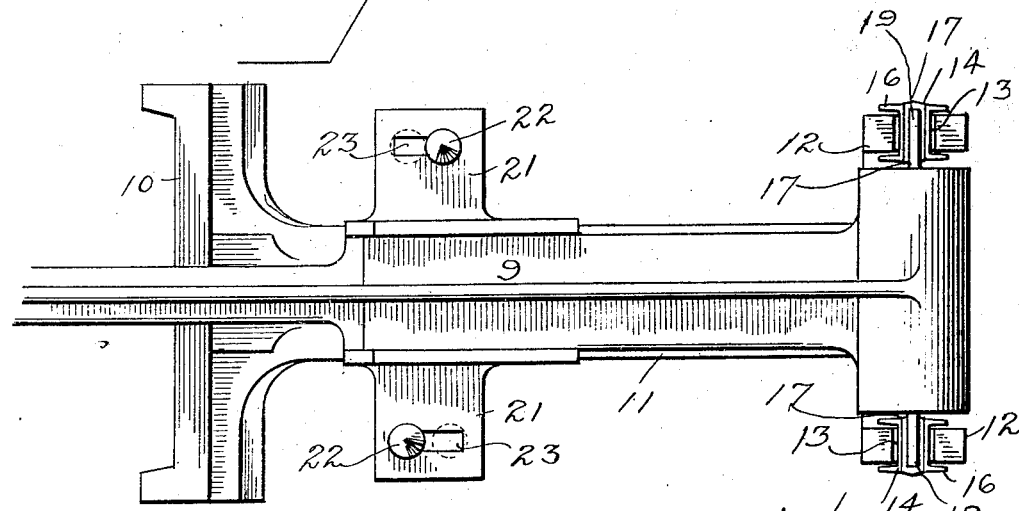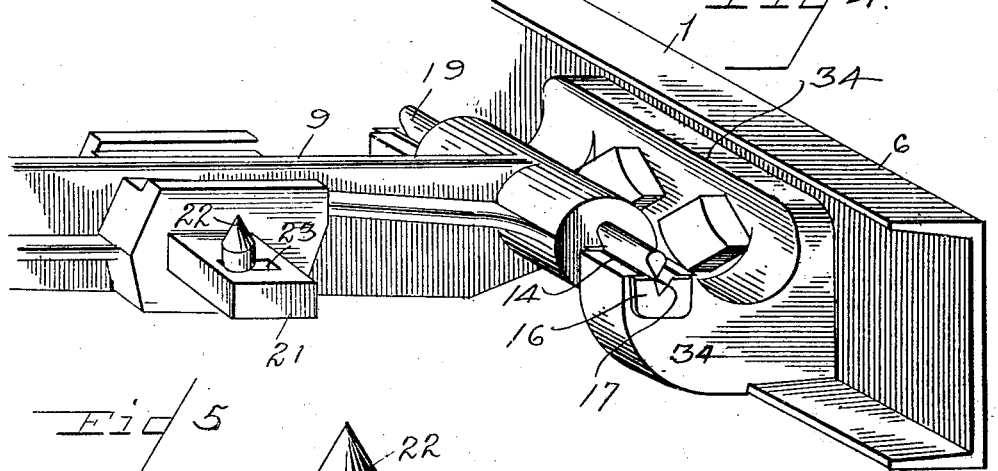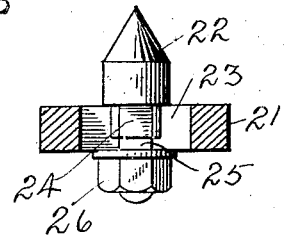

ALBERT J. ZIMMERMAN, OF DAYTON, OHIO, ASSIGNOR, BY MESNE ASSIGNMENTS, TO THE RICHMOND-STANDARD MANUFACTURING COMPANY, OF RICHMOND, INDIANA, A CORPORATION OF INDIANA.

WEIGHING-SCALE.

1,267,344.

Specification of Letters Patent.

Patented May 21, 1918.

Application filed July 17, 1916, Serial No. 109,869. Renewed April 15, 1918. Serial No. 228,806.

*To all whom it may concern:*

Be it known that I, ALBERT J. ZIMMERMAN, a citizen of the United States, residing at Dayton, in the county of Montgomery and State of Ohio, have invented certain new and useful Improvements in Weighing-Scales, (Case A,) of which the following is a specification.

My invention relates to weighing scales and more particularly to scales of large capacity such as wagon or car scales but is also applicable to scales of less capacity.

The object of the invention is to simplify the structure as well as the means and mode of operation of such devices whereby they will not only be cheapened in construction, but will be more efficient in use, sensitive, and accurate in operation, self adjusting and unlikely to get out of repair.

A further object of the invention is to provide improved automatic compensating means for the fifth or cross lever whereby the scale will be rendered more sensitive and the cross lever and weighing beam will be unaffected by longitudinal or lateral oscillation of the scale platform or variation of the levers from normal alinement but will respond only to vertical movement thereof.

A further object of the invention is to provide an improved form of self adjusting or compensating fulcrum block and an improved form of flexible connection between the fifth or cross lever and the long lever which will co-act with the adjustable or compensating fulcrum block to compensate for any variation of the fifth or cross lever from normal or alined position.

A further object of the invention is to provide an improved form of adjustable connection between the fifth or cross and long levers whereby the leverage of the cross lever may be varied to equalize the operations of the opposite ends of the scale.

With the above primary and other incidental objects in view, as will more fully appear in the specification, the invention consists of the features of construction, the parts and combinations thereof, and the mode of operation, or their equivalents, as hereinafter described and set forth in the claims.

Referring to the drawings, Figure 1 is a plan view of an assembled scale to which the present invention has been applied, a portion of the platform being removed to disclose the location and relation of the platform levers and their bearings. Fig. 2 is a perspective view of the fifth or cross lever supported upon its chair or bracket with one of the flexible connecting clevises suspended thereon. Fig. 3 is a top plan view of the fifth lever and supporting bracket or chair illustrating the range of adjustment or variation of the bearings. Fig. 4 is a perspective view of a modification of the construction shown in the preceding figures in which the fifth or cross lever is shown supported upon the outer side of the main frame bar. The same figure would illustrate the application of the fifth lever to a support upon one of the platform beams which construction is sometimes used but is not a preferable one. Fig. 5 is a detail view of one of the adjustable bearing points or studs. Figs. 6 and 7 are detail views of the flexible clevis or connection between the fifth and long levers. Fig. 8 is a perspective view of one of the self adjusting or compensating fulcrum blocks removed from the bracket or chair. Fig. 9 is a top plan view thereof and Fig. 10 is a transverse sectional view of the fulcrum block.

Like parts are indicated by similar characters of reference throughout the several views.

The present invention relates particularly to the supporting and operating connections of the cross or fifth lever. As usually constructed the longitudinal and lateral oscillation or vibration of the scale platform, caused by driving a wagon on or off the scale or by placing heavy loads thereon causes a corresponding vibration of the fifth lever and its bearings, and a tremor or vibration of the weighing beam. This vibratory movement when transmitted to the fifth or cross lever and weighing beam not only renders the operation of weighing more difficult and less accurate but causes more or less wear upon the knife edge fulcrum bearing of the cross lever and the clevis bearings through which the fifth lever is connected with the long or platform levers. The wearing of these bearings causes the scale to become less sensitive and in time destroys the accuracy of its operation. To overcome this difficulty by providing flexible or yielding connections between the fifth or cross lever and the long or platform lever and a yielding or shifting fulcrum support which will automatically adjust itself to the alinement of the cross or fifth lever thereby automatically compensating for any inaccuracy of adjustment to maintain the proper relation between the knife edge fulcrum bearings of the fifth lever and the fulcrum block and to compensate for lateral vibrations or oscillations whereby such vibrations will not be transmitted to the bearings of the beam is one of the primary objects of the present invention.

In the drawings, 1 is the scale frame which may be of metal, preferably channel irons, or of wood or concrete as desired. Located at each end of the frame 1 are round or transverse lever 2—2 fulcrumed upon knife edge bearings 3 engaging vibratory fulcrum blocks 4. The vibratory fulcrums 4 and supporting brackets for the round levers 2 form the subject matter of a separate invention disclosed in a companion application and will not be here described in detail. At their inner sides the round or transverse levers 2 carry knife edge bearings 5 upon which are supported the platform or floor beams 6 on which is located the usual floor of planks 7. Rigidly secured to the round levers 2 and extending inward therefrom are the long levers 8 which at their inner or adjacent ends are connected with the cross or fifth lever 9. The construction thus far described is that generally employed in scales of this type. On account of the vibratory support 4 for the round or transverse levers 2 the platform is capable of both longitudinal and lateral vibration in addition to its vertical movement by which the weight of the load or draft is determined.

Secured to the inner side of one of the side bars of the main frame 1 is a supporting chair or bracket for the cross or fifth lever 9 comprising a head 10 bolted to the side bar 1 from which projects an arm 11 carrying at its inner free end a substantially U shaped head 12. The upper ends of the arms forming the U shaped head 12 are bifurcated at 13 and within such bifurcations are loosely supported floating or self adjusting fulcrum blocks 14. These self adjusting fulcrum blocks 14 are provided on their upper face with a V shaped depression or groove 15 and at opposite ends are flanged as at 16 to overhang the sides of the recesses or bifurcations 13 of the U shaped head 12. Furthermore, the outer faces of the floating fulcrum blocks are formed convex or slightly pointed or pyramidal as indicated at 17. These projecting or convex faces afford limited lateral or thrust bearings for the fifth or cross lever, thereby reducing to minimum the friction between the fulcrum block and the fifth lever due to lateral contact. The body of the floating fulcrum block 14 is of less width than the recess or bifurcation 13 whereby the floating blocks are capable of lateral play or adjustment within the recesses 13 and the flanges 16 are spaced sufficient distance from the side faces of the arms of the head 12 to permit a twisting or skew movement of the floating fulcrum blocks within the recesses 13. To decrease the frictional engagement of the fulcrum block with the bottom of the recesses 13 and thereby reduce the resistance to lateral or differential adjustment, the bottom of the body portion of the block is slightly recessed or concave as at 18 whereby but two lines of contact with the bottom of the recess is afforded. This construction enables the floating fulcrum blocks to freely slide to and fro within the recesses 13 or to adjust themselves to inclined or skew position in accordance with the alinement with the fifth or cross lever 9 whereby the edge of the knife edge bearing 19 of the fifth or cross lever is maintained in the bottom or apex of the V groove 15 of the block. Without such free adjustment of the fulcrum block the knife edge bearing is caused to climb the inclined side of the V groove 15 with each variation of alinement or vibration of the fifth lever, thereby wearing or grinding the edge of the knife edge bearing and the fulcrum block one upon the other, causing the bearing to become dull and affecting the sensitiveness and accuracy of the scale. Furthermore, in a construction in which the fulcrum block is rigidly supported a slight variation of alinement of the fifth or fulcrum lever will throw the knife edge bearing out of alinement with the bottom or apex of the V groove, thereby causing the bearing to bind more or less and resisting free movement of the levers. These difficulties are overcome by the use of the floating bearing as herein before described.

A floating or compensating fulcrum support, however, will be offset or counteracted to some extent by a non-yielding connection between the fifth or cross lever and the long lever. To secure full benefit of the floating fulcrum support a flexible or yielding connection is desirable between the said levers. Furthermore, a connection or clevis possessing flexibility will compensate for the lateral oscillation or vibrations of the platform levers and thus prevent the transmission of such vibration to the cross or fifth lever and scale beam. This will result in conserving the bearings and preserving the accuracy and sensitiveness of the scale. To this end there has been provided a flexible or loose jointed clevis which is engaged upon pointed studs or pins in the fifth and long levers, respectively, thus forming a universal joint which will readily yield or respond to any horizontal vibration or oscillation. The clevis is such as to permit a twisting or warping movement as indicated in Fig. 7.

To this end there are provided in lateral extending arms 21 carried by the fifth or cross lever 9 upward projecting pointed studs or pins 22. These studs or pins are adjustably mounted in slots 23 located in the arms 21 whereby the studs or pins may be independently adjusted to and from the fulcrum bearing of the lever. The stud or pin is shown in detail in Fig. 5 and embodies a conical head beneath which is a flat shoulder 24 engaging in the slot 23 to prevent the rotation of the stud or pin and a screw threaded shank 25 to receive the nut 26 by which the pin or stud is secured in its adjusted position. The elongated slots 23 in the arm 21 permit the pointed pins or studs 22 to be independently adjusted to and from the bearings. This enables the scale to be readily adjusted to compensate for variations in the draft or weight of opposite ends of the scale. Furthermore, when wagons are driven upon a scale always from the same end and off the scale at the opposite end, one end or the other of the scale often becomes less sensitive or varies in its operations from that of the opposite end of the scale. The usual practice under such conditions is to file the knife edge bearing 3 or 5 of the round or transverse lever in such way as to throw the bearing edge of such knife edge bearing inward or outward sufficient to compensate for the variation of operation. The filing of the knife edge bearings 3 or 5 to correct such inaccuracy requires great skill upon the part of the operator and furthermore weakens the scale and destroys the possibility of readjustment at a later date. The same result can be accomplished in the present construction without modifying or changing the knife edge bearings of the round or transverse levers by adjusting the varying stud 22 to or from the knife edge fulcrum 19 of the fifth or cross lever. Thus by adjusting the pointed stud away from the fulcrum the leverage is increased and the adjustment of the stud toward the fulcrum decreases the leverage. By adjusting the bearing stud or pin 22 on the opposite arm 21 to different positions in relation with the fulcrum of the lever any variation in the operation of the opposite ends of the scale may be equalized and the sensitiveness and accuracy of the scale may be retained.

A similar stud or bearing point is provided in the end of the long or platform lever 8. The last mentioned point or stud, however, is turned downward. The adjustable or yielding clevis before mentioned comprises two parallel heads or bars 27 loosely connected one with the other by bolts 28. These bolts are seated in recesses 29 in the outer faces of the heads or bars 27. The bottoms of the recesses are preferably, though not necessarily, formed concave while convex washers 30 may be located within the recesses 29 beneath the heads of the bolts 28. The holes 31 in the bottoms of the recesses 29 through which the shafts of the bolts 28 extend are sufficiently large to permit a generous degree of side play or oscillation as indicated by dotted lines in Fig. 6 and Fig. 7, whereby the heads 27 may yield in relation one with the other in any direction. Located in the inner faces of the heads or cross bars 27 intermediate the connecting bolts 28 are hardened concave bearing blocks 32 which engage the pointed pins or stud bearings of the fifth and long levers respectively. If so desired, the bottoms of the recesses 29 may be formed substantially flat and the convex washers may be omitted in which case the bolts, in their oscillatory or swinging movement, will rock upon the edges of the heads and nuts of the bolt, respectively. This construction will be found efficient for ordinary use although the construction previously described and shown in Fig. 6 will be more flexible and yielding and therefore more desirable. The flexibility of the clevis is such that the heads or bars 27 may be twisted to positions inclined one to the other as indicated in the end view Fig. 7. By the use of this flexible clevis the horizontal oscillation of the long lever 8 whether same be longitudinally or transversely, will be compensated for by the swinging movement or flexibility of the clevis and the vibration of the platform and its levers will not be transmitted to the fifth lever nor to the weighing beam. In Fig. 4 there is shown a modification of the construction before described. In Figs. 1 to 3 the supporting bracket or chair for the fifth or cross lever is extended inward from the side bar of the main frame 1 and the side bar is provided with an opening or recess 33 through which the lever 9 projects. For certain conditions of use it is desirable to support the fifth or cross lever upon the outer side of the main frame 1 which may be done by means of a bracket or chair 34 bolted thereto as shown in Fig. 4. The construction of the floating fulcrum bearing and the adjustable pin or stud bearing for the long lever is exactly the same as before described. In this construction the long levers would be bent laterally and extended beneath the side bar 1 to positions in vertical alinement with the arms 21.

Although the practice is not to be recommended, the fifth or cross lever is sometimes supported directly upon the platform beam. This construction is objectionable through the fact that the fulcrum support vibrates vertically with the platform during the weighing operation and by its vertical vibration compensates to some extent for the draft or load upon the platform thereby making the scale less sensitive and inaccurate. However, Fig. 4 will further illustrate such construction in which the channel beam shown may be considered as the floor beams 6 in lieu of the side frame bar 1. The construction would otherwise be as before described.

From the above description it will be apparent that there is thus provided a device of the character described, possessing the particular features of advantage before enumerated as desirable but which obviously is susceptible of modification in its form, proportion, detail construction, or arrangement of parts without departing from the principle involved or sacrificing any of its advantages.

While in order to comply with the statute the invention has been described in language more or less speicfic as to certain structural features, it is to be understood that the means and construction herein described comprise but one mode of putting the invention into effect and the invention is therefore claimed broadly in any of its possible forms or modifications within the scope of the appended claims.

Having thus described my invention, I claim:

1. In a weighing scale, the combination with a main frame, a platform, platform levers, and a cross lever connected thereto of a bifurcated supporting bracket for said cross lever, independent fulcrum bearing blocks loosely mounted on said bracket and capable of lateral shifting movement in a substantially horizontal plane in relation with the bracket independent of each other and independent of the bracket and the lever.

2. In a weighing scale, the combination with a main frame, a platform and a system of scale levers by which the weight of a load or draft upon the platform is determined, of a bracket or support, and a floating lever fulcrum bearing carried thereby capable of lateral shifting movement in a horizontal plane to different positions angular or offset in relation one with another whereby said fulcrum bearing will automatically adjust itself to agree with variations of the lever bearing coacting therewith.

3. In a weighing scale, the combination with a main frame, a platform and a system of scale levers by which the weight of a load or draft upon the platform is determined, of a bracket or support, a floating fulcrum block adapted to receive a lever bearing loosely mounted thereon, said fulcrum block being capable of shifting movement in a horizontal plane in unison with the lateral variation of the lever supported thereon, substantially as and for the purpose specified.

4. In a weighing scale, the combination with a main frame, a platform and a system of scale levers by which the weight of a load or draft upon the platform is determined, of a bracket or support, a floating fulcrum block adapted to receive a lever bearing loosely mounted thereon, said block having a recessed base whereby the sliding bearing of the block upon the bracket is reduced, said floating fulcrum block being free for adjustment to different positions in a horizontal plane independent of said bracket to accommodate said bearing to lateral variations of the lever, substantially as and for the purpose specified.

5. In a weighing scale, the combination with a main frame, a platform and a system of scale levers by which the weight of a load or draft upon the platform is determined, of a bifurcated bracket or support, a floating fulcrum bearing member of less width than the bifurcation loosely fitted therein and capable of shifting movement in a horizontal plane independent thereof and terminal flanges on said bearing member overhanging the margins of the bifurcation.

6. In a weighing scale, the combination with a main frame, a platform and a system of scale levers by which the weight of a load or draft upon the platform is determined, of a bracket or support, a floating fulcrum block loosely mounted thereon having a grooved depression in the base thereof, and said block being capable of shifting movement in a horizontal plane in relation with the bracket to accommodate the bearing to horizontal variations of the lever, substantially as and for the purpose specified.

7. In a weighing scale, the combination with a main frame, a platform and a system of scale levers by which the weight of a load or draft upon the platform is determined, of a support or bracket, a floating fulcrum bearing block loosely mounted thereon for shifting movement in a horizontal plane, said bearing block having a convex end adjacent to the lever supported thereon, said bearing being free to accommodate itself to lateral variations of the lever.

8. In a weighing scale, the combination with a main frame, a platform and a system of scale levers by which the weight of a load or draft upon the platform is determined, of a support or bracket, a floating fulcrum block loosely mounted thereon and a friction point of reduced area projecting from the block toward the lever supported thereby and movable with the block, said fulcrum block being free for lateral shifting movement to accommodate it to horizontal variations of the lever.

9. In a weighing scale, the combination with a main frame, a platform and a system of scale levers by which the weight of a load or draft upon the platform is determined, of a bracket or support, a floating fulcrum bearing block loosely mounted thereon, the adjacent faces of the bearing block and the lever supported thereby being non-parallel thereby affording engaging frictional surfaces of reduced area, said block being capable of free shifting movement in relation with the bracket or support to accommodate itself to lateral variations of the lever.

10. In a weighing scale, the combination with a main frame, a platform and a system of scale levers by which the weight of a load or draft upon the platform is determined, of a bracket or support, a floating fulcrum bearing block loosely mounted thereon, the adjacent bearing faces of the floating bearing block and the bracket or support being non-parallel whereby the frictional engagement of the block upon the support will be of reduced area, said floating bearing block being free for lateral shifting movement to accommodate itself to lateral variations of the lever supported thereby.

11. In a weighing scale, the combination with a main frame, a platform and a system of scale levers by which the weight of a load or draft upon the platform is determined, of a support, a floating fulcrum bearing block mounted thereon for free oscillatory movement in a substantially horizontal plane whereby said block may accommodate itself to lateral variations of the lever supported thereby substantially as and for the purpose specified.

12. In a weighing scale, the combination with a main frame, a platform, platform levers, a cross lever, separate links connecting the platform levers and cross lever, of independently movable link bearings carried by the cross lever adjustable to and from the fulcrum of said cross lever.

13. In a weighing scale, the combination with a main frame, a platform, platform levers, a cross lever, operative connections between the platform levers and cross lever, and adjustable means for varying the operative leverage of said cross lever in relation with one of the platform levers independent of the other platform lever.

14. In a weighing scale, the combination with a main frame, a platform, platform levers, a cross lever, separate links connecting the platform levers and cross lever, and a separate bearing stud for each link, each of said bearing studs being independently adjustable on said cross lever.

15. In a weighing scale, the combination with a main frame, a platform, platform levers, a cross lever, a link connecting each of the platform levers and cross lever, said cross lever having an elongated opening therein, and a bearing stud for the link adjustably mounted in said elongated opening.

16. In a weighing scale, the combination with a main frame, a platform, platform levers, and a cross lever, of independent adjustable connections between the respective platform levers and the cross lever whereby said levers may be connected to the cross lever at different distances from its fulcrum.

17. In a weighing scale, the combination with a main frame, a platform, platform levers, and a cross lever, of independent links connecting the respective platform levers with the cross lever and independently adjustable bearings for said links carried by the cross lever.

18. In a weighing scale, the combination with a main frame, a platform, platform levers, and a cross lever, of adjustable means for independently connecting the platform levers to the cross lever whereby the influence of the respective platform levers upon the cross lever may be independently varied.

19. In a weighing scale, the combination with a main frame, a platform, platform levers, and a cross lever, of a connecting clevis embodying a universal joint whereby said clevis may freely yield to compensate for lateral variations of the levers.

20. In a weighing scale, the combination with a main frame, a platform, platform levers, and a cross lever, of a connecting clevis comprising spaced bearing bars, links connecting said bars and universal joints between the links and bars, substantially as specified.

21. In a weighing scale, the combination with a main frame, a platform, platform levers, and a cross lever, of floating fulcrum bearings for the cross lever capable of lateral shifting movement to accommodate themselves to lateral variations of the lever and a universal connection between the platform levers and cross lever adapted to compensate for lateral adjustment of the cross lever and its bearings.

22. In a weighing scale, the combination with a main frame, a platform, platform levers, and a cross lever, of floating fulcrum bearings for the cross lever capable of lateral shifting movement to accommodate themselves to lateral variations of the lever, and a clevis connecting the platform and cross levers comprising oppositely disposed bearing members and a universal joint connecting the bearing members one with the other whereby said clevis will compensate for lateral variation of the cross lever and its bearings.

In testimony whereof, I have hereunto set my hand this 10th day of July, A. D. 1916.

ALBERT J. ZIMMERMAN.

Witnesses:
B. H. RANNELDS,
THOMAS B. HERMAN.

Copies of this patent may be obtained for five cents each, by addressing the "Commissioner of Patents, Washington, D. C."